United States Patent [19]

Golben

[11] 4,110,109

[45] Aug. 29, 1978

[54] OXIDATION INHIBITION OF STEEL WOOL IN SILVER RECOVERY

[75] Inventor: Michael Golben, Maplewood, Minn.

[73] Assignee: Minnesota Mining and Manufacturing Company, Saint Paul, Minn.

[21] Appl. No.: 845,911

[22] Filed: Oct. 27, 1977

[51] Int. Cl.$^2$ ............................................. C22B 11/04
[52] U.S. Cl. ................................. 75/109; 75/118 R; 75/118 P
[58] Field of Search .................. 75/109, 118 R, 118 P

[56] References Cited

U.S. PATENT DOCUMENTS

| | | | |
|---|---|---|---|
| 2,221,163 | 11/1940 | Barnes et al. | 75/118 P X |
| 3,094,490 | 6/1963 | Gardner et al. | 252/149 |
| 3,194,653 | 7/1965 | Keyes | 75/109 |
| 3,369,801 | 2/1968 | Hartman | 75/118 P X |
| 3,490,898 | 1/1970 | Venkatakrishnan et al. | 75/98 |
| 4,035,181 | 7/1977 | Fisch | 75/109 |

*Primary Examiner*—G. Ozaki
*Attorney, Agent, or Firm*—Cruzan Alexander; Donald M. Sell; Mark A. Litman

[57] ABSTRACT

The addition of certain materials which inhibit corrosion and hydrogen embrittlement of iron to silver-rich solutions or to steel wool which is used to desilver such solutions reduces hydrogen ion attack on the iron in the cementation of silver.

3 Claims, No Drawings

OXIDATION INHIBITION OF STEEL WOOL IN SILVER RECOVERY

BACKGROUND OF THE INVENTION

During processing of silver halide photographic materials, silver is often carried out of the photographic elements and into solutions, particularly the fix and bleach/fix solutions. As silver has more than a modest intrinsic value, many methods have been devised for desilvering these solutions to regain the metallic silver. Amongst the many available methods for reducing the silver in solution are electrolytic reduction, contact reduction with a metal, and chemical reduction. Each of these methods has its own advantages and disadvantages.

Electrolytic reduction produces high purity silver because it reduces ionic silver by merely supplying electrons to the silver ions in solution. It requires a large initial capital expenditure and therefore reduces the profitability of silver recovery. Electrolytic reduction is also ineffective at low concentrations of silver.

Chemical reduction and precipitation (as sulfide) also can produce high purity silver, but the cost of the most effective reducing agents can be significant. The particle size of the reduced silver or silver sulfide also can be quite small leading to difficulties in recovering the silver.

Metal contact reduction is an inexpensive means of reducing silver, but produces a low purity silver because of commingling with residual iron used in the oxidation/reduction process.

This metal displacement type of silver recovery process has traditionally been performed by passing silver rich solutions over iron, usually in the form of steel wool, wherein an electron exchange occurs between the active iron and the silver in solution. Iron is put into solution as ferrous ions and the silver is allowed to settle out. The iron metal $Fe°$ is oxidized mostly to ferrous ion and the silver ion $Ag^+$ is reduced to silver metal. Because the iron or steel wool sits in an aqueous acidic solution during this process, it is subject to attack due to oxidation or hydrogen ion effects. Furthermore, the embrittlement of the steel wool in the acidic aqueous environment of spent fixer, such as fixer for X-ray, graphic arts, and other black and white fixers, tends to break down the filament structure and thus to destroy the electron pathway by which the silver ions in various parts of the solution are reduced by available iron wherever it may be found. This further decreases the percent utilization of all unoxidized iron.

When the stoichiometric balances between iron taken into solution and the amount of silver reduced were evaluated, it was found that in typical long term processing, whether continuous or intermittent in operation, much more iron was being brought into solution than would be expected from the metal displacement silver recovery reaction.

PRIOR ART

In U.S. Pat. No. 4,035,181, certain materials were found which could be placed in the solutions or on the steel wool to reduce the amount of iron brought into solution. In that patent it was noted that materials with free acid hydrogens thereon were not desirable if applied to the steel wool because the hydrogen ions were believed to accelerate corrosion of the iron.

Contact reduction (metal displacement) silver recovery has been described in prior art such as U.S. Pat. Nos. 3,630,508 and 3,369,801. Other techniques suggest the addition of certain materials to silver rich solutions which reduce the iron loss during active use of the contact reduction process by acting as reducing agents themselves and therefore changing the amount of iron necessary to reduce a given amount of silver. These techniques are used in neutral or slightly alkaline environments such as bleach fix baths which do not require strong inhibitors as iron corrosion is much less. In a bleach fix bath, this last process is believed to work by converting $NaFe^{(III)}EDTA$ to $Na_2Fe^{(II)}EDTA$ and thereby eliminating the non-silver productive oxidative action of the first complex on steel wool and also the dissolving action of that complex on silver already deposited. This reduction of the complexed iron is effected by the addition of the chemical reducing agent.

SUMMARY OF THE INVENTION

It has been found in the practice of the present invention that certain materials, some having free hydrogen ions, may be added to the steel wool in metal contact silver recovery processes if the material is a sufficiently strong inhibitor of hydrogen attack on iron.

It has been found that the addition of these certain materials to solutions and steel wool used in metal displacement silver recovery systems are especially effective in decreasing the amount of iron which passes into solution during dormant periods of such processes. Additionally, these materials prevent the embrittlement of the steel wool which contributes to filament structural breakdown and interruption of electron pathways.

In the practice of the present invention, it has been found that the addition of certain materials to silver-rich solutions or to steel wool which is used to desilver such solutions reduces hydrogen ion attack on the iron and decreases the non-productive amounts of iron being brought into the solution. The materials useful in the practice of the present invention are represented by the formulae:

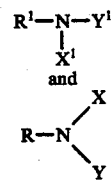

wherein
$R_1$ is abietyl, hydroabietyl, dehydroabietyl, or $C_4$–$C_{20}$ alkyl $X^1$ and $Y^1$ are $+CH_2CH_2O)_mH$ and $+CH_2CH_2O)_nH$ where $m+n$ equals at least 1 and $m$ and $n$ individually are from 0 to 15, X is H or $CH_2A$, and Y is $CH_2A$ wherein A is an alpha ketonyl comprised of only C, H and carbonyl O. These alpha ketones may be substituted with a mercaptan sulfur or a pendant amine group having only H atoms and $C_4$–$C_{10}$ alkyl groups attached to the amine nitrogen, and R is selected from the group consisting of abietyl, hydroabietyl, dehydroabietyl, and $C_4$–$C_{20}$ alkyl, said structure having no more than 50 carbon atoms therein.

Examples of ketones which may be reacted with amines and aldehydes (e.g., as by the teachings of U.S. Pat. Nos. 3,094,490; 2,510,063; 2,564,259; and 2,758,970) to form some of the compounds of the present invention are

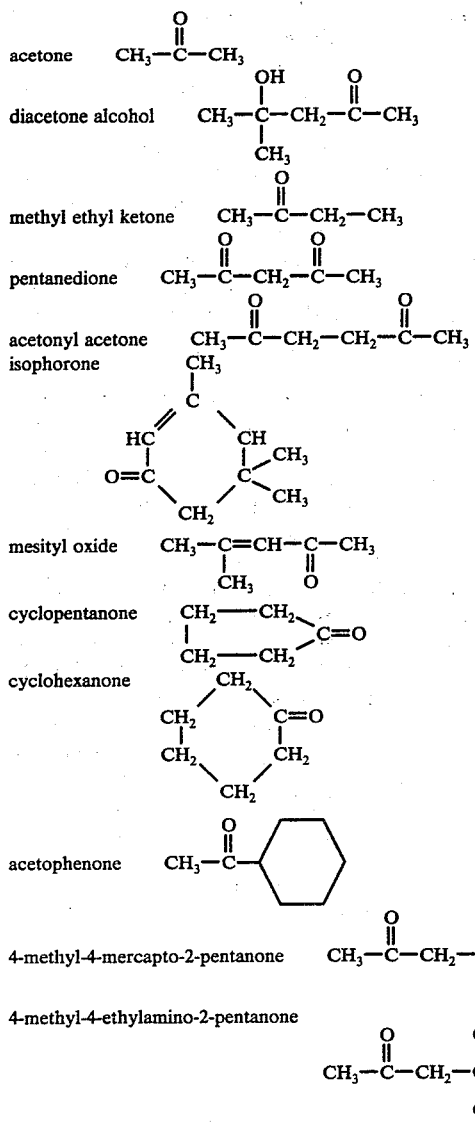

The ketones react with the starting amines to eliminate a hydrogen from the alpha carbon and combine as follows:

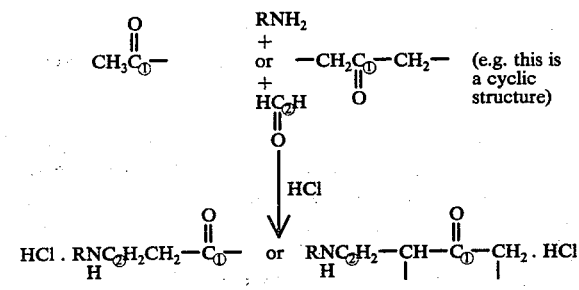

The remaining hydrogen on the amine may also be similarly replaced.

The metal contact reduction element used in the practice of this invention would have a container with an inlet and outlet means for liquids and steel wool within the container in physical contact with the above described additives. This contact may be provided by coating the materials onto the surface of the steel wool or by providing the additives to the silver rich liquids, continuously or by batch operation.

Practice of the present invention will be best understood after a reading of the Examples.

EXAMPLE 1

"Static" weight loss procedure

Steel wool samples were shaped into donuts about 1½" in diameter after rinsing with water, washing with acetone, and drying at 105° C. The donuts were placed in tarred beakers and both were weighed. Fresh lithographic fixer with no silver (see Example 3) or fixer containing desired quantity of additive was added to the beaker, which was allowed to stand at room temperature for the selected duration of the test (4 hrs., 16 hrs. or 64 hrs.). At completion of the stand time, fixer solution is decanted carefully. The residue is washed by adding water and decanting about 4 times, followed by an acetone wash and drying at 30" Hg at 105° C. for 1 hour. The beaker and contents are cooled and weighed.

$$\% \text{ weight loss} = \frac{(\text{Original wt} - \text{final wt}) \times 100}{\text{Original wt}}$$

Results

Various grades of steel from 6 different suppliers were tested "as received" or not cleaned. The % weight loss after 16 hours ranged from 21.1% to 59.8%. This loss is due entirely to corrosion, since the fixer container no silver and results show how rapidly the steel wool is lost under "static" conditions without the presence of a protective additive. Simply pre-dipping one type of wool in 0.5% aqueous solution of the reaction product of the amine (dehydroabietyl), acetone, and formaldehyde, reduced weight loss from 33.5% to 2.1%.

EXAMPLE 2

Dynamic "yield" tests

For these tests a small cell was constructed from a hypodermic syringe in which a plug of steel wool averaging 0.6 g in weight was placed between two plugs of glass wool with upward flow of fixer solution proportioned to an equivalent of 500 ml/min through a regular cartridge (8 lbs. steel wool). Yield ratio was calculated from weight of the dried residue over the initial weight of steel wool. Percent theoretical conversion of the steel wool was calculated from the yield ratio.

$$\% \text{ theoretical conversion} = \frac{\text{yield ratio} \times 100}{3.86}$$

Implicit in this expression are the assumptions that (1) the iron has been oxidized substantially to the +2 level and (2) the residue has very little iron left in it.

The first series of "dynamic" tests involved passing fresh fixer solutions (no silver content) of different formulations through the same type of steel wool and determining the extent of corrosion taking place.

| Type of Fixer | pH | % Weight Loss | Duration of Run |
|---|---|---|---|
| X-ray | 4.4 | 100% | 18 hrs |
| Lithographic | 4.6 | 88% | 6 hrs |

It is obvious from the data that absence of an inhibitor results in very rapid corrosion in the case of X-ray and Lithographic film solutions.

"Yield ratios" for the two types of fixer were obtained by passing spent fixer (with appreciable silver content) through the same type of steel wool. No additives were used.

| Type of Fixer | Yield Ratio | Ave. Theor. % Conversion | Grams Ag per Gram Original Fe |
|---|---|---|---|
| X-ray | 1.42 | 36.8 | — |
| Lithographic | 2.60 | 67.3 | 2.44 |

Note that the ratio of silver to initial weight of iron as determined by actual analysis approaches the "yield ratio", thus supporting the assumption that the residue substantially consists of silver, though not entirely so.

The yield ratio of 1.42 for X-ray fixer means that a standard cartridge containing initially 8 lbs. of steel wool would contain up to 165 troy ounces of silver, somewhat above the "experience" value of 100 troy ounces, normally obtained but considerably below the "theoretical" ideal of 450 troy ounces. The lithographic fixer result would amount to a yield of as much as 304 troy ounces of silver.

Experiments in which inhibitors were added to X-ray fixer also involved different methods of "leaching" out the inhibitor during the course of a run. Basically this consisted of presaturating absorbent materials such as sawdust, wood, paper, cardboard, with the inhibitor. The inhibitor also was added in solid form (Rodine 213). It was expected that the inhibitor would gradually dissolve and enter the influent fixer solution stream. Results of these experiments follow:

| Inhibitor | Wt. % Based on Steel Wool | Carrier | Yield Ratio |
|---|---|---|---|
| None | | | 1.42 |
| Rodine 213 | 11.1 | Sawdust | 1.56 |
| Rodine 213 | 22.7 | Paper interleaf | 2.11 |

The beneficial effect of inhibitor on yield is evident.

The material (Rodine 213) is believed to be of the formula

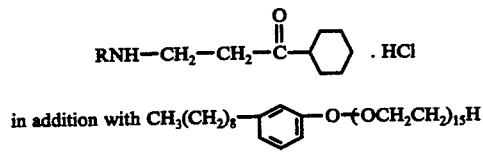

in addition with wherein R is dehydroabietyl, and the material is added with a solvent mixture (isopropanol-acetone-methanol).

EXAMPLE 3

A test procedure was developed to show the usefulness of materials as both hydrogen embrittlement and corrosion inhibitors.

1.0 gram samples of clean steel wool were added to small beakers containing 50 ml of an X-ray fixer solution comprising a thiosulfate solution at pH 4.5. 0.1% by weight of the inhibitor to be evaluated was dissolved or dispersed in the solution. Visual observation would determine whether the brightness of the steel was retained. Observations were made at 1 hour, 15 hours, and 4 days. A control solution without inhibitor was evaluated in comparison with the other solutions. The ratings were 3 for no diminution of brightness, 2 for loss of polish from the surface, 1 for graying of the surface and 0 for heavy darkening. Materials evaluated which were within the scope of the invention were as follows:

A. Polyrad 1110, dehydroabietyl amine reacted with ethylene oxide in a ratio of 1/11, respectively. The formula is

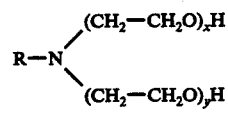

wherein R = dehydroabietyl, and the average value for the sum of the positive integers $x$ and $y$ is 11. The rating of this material was 3 after 1 hour and 2 after both 15 hours and 4 days.

B. Armohib 31, a mixture of 71.2% by weight

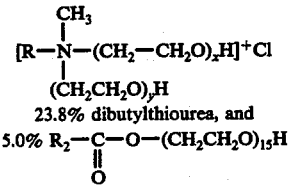

23.8% dibutylthiourea, and 5.0% $R_2-\overset{O}{\underset{\|}{C}}-O-(CH_2CH_2O)_{15}H$ wherein R is a mixture of $C_8-C_{18}$ fatty acids, $x+y=15$ and $x$ and $y$ are at least 1, and $R_2$ is abietyl. The rating of this material was 3, even after 4 days in solution.

C. Antarox G-100, an adduct between ethylene oxide and sperm oil polyamines and amides (sperm oil fatty acids, triethylene triamine, diethylene amido amine, with 60% ethylene oxide content). This was rated as 3 after 1 hour and 2 after 4 days.

D. Antarox G-200, the same as above (Antarox G-100) except that beef tallow fatty acids are used in the reaction. The general structural formula of both

wherein R is a $C_4$ or greater fatty acid residue of the reaction product with the amine and amide, X is H or $-(CH_2CH_2O)_mH$, Y is $-(CH_2CH_2O)_nH$ and $m+n$ are positive integers such that the weight percent of $-(CH_2CH_2O)$ is about 60% of the molecular weight of the composition.

What is claimed is:

1. In the process of reducing silver ions from a silver rich solution by contacting said silver rich solution with iron, the improvement which comprises contacting said silver rich solutions with said iron in the presence of a material which inhibits corrosion and hydrogen embrittlement of said iron, said material having no more than 50 carbon atoms and being represented by either of the formulae:

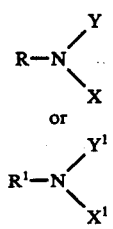

wherein
R and R¹ are abietyl, hydroabietyl, dehydroabietyl, or $C_4$-$C_{20}$ alkyl,
X is H or —$CH_2A$
Y is —$CH_2A$, and
A is an alpha ketonyl group
X¹ and Y¹ are —$(CH_2CH_2O)_mH$ and —$(CH_2CH_2O)_nH$ respectively wherein $m+n$ is at least 1 and $m$ and $n$ may each be 0 to 15.

2. The process of claim 1 wherein the material is represented by formula I and the alpha ketonyl is comprised of only C, H and O atoms.

3. The process of claim 1 wherein said material is represented by formula I and the alpha ketonyl is comprised of only C, H and O atoms except for either a mercaptan sulfur atom or a pendant amine having only H atoms and $C_4$-$C_{10}$ alkyl groups attached to the amine nitrogen.

* * * * *